Patented Oct. 25, 1938

2,134,456

UNITED STATES PATENT OFFICE 2,134,456

MANUFACTURE OF WATER-SOLUBLE CALCIUM COMPOUNDS

Arthur Stoll and Ernst Burckhardt, Basel, Switzerland, assignors to the firm of Chemical Works formerly Sandoz, Basel, Switzerland No Drawing. Application September 19, 1932, Serial No. 633,926. In Switzerland March 4, 1932

3 Claims. (Cl. 260—535)

It has been found that new water-soluble calcium compounds can be prepared by treating calcium salts of polyhydroxymonocarboxylic acids, derived from polyaldoses with calcium bromide.

For carrying out the present process, the isolated calcium salts such as calcium lactobionate, calcium maltobionate and the like are dissolved while heating in water together with equimolecular proportions of calcium bromide, whereby new calcium bromide double compounds are formed. These compounds crystallize out on cooling down the solution or they may be precipitated by means of an addition to their aqueous solutions of such organic solvents that are miscible with water, such as ethanol and the like.

The aforesaid double compounds can further be obtained by simply pulverizing and mixing the components in a dry state whereby the crystal water contained in calcium bromide may suffice to allow the formation of the desired double compounds. It is also possible to prepare them during the process of manufacture of the polyhydroxymonocarboxylic acids, for instance by oxidizing milk sugar with calcium hypobromite in presence of calcium hydrate, whereby the new calcium bromide compound may be directly isolated from the solution.

The new calcium double salts are in dry state colorless, inodorous and non-hygroscopic compounds which are easily soluble in water. They are especially suitable for therapeutical application and can advantageously be used for injections. The sedative action of the new calcium double salts, prepared in accordance with the present invention, is particularly noteworthy and unexpected, this action being about twice that which corresponds to the bromine content thereof without causing "bromine rash". As a matter of fact, the skin irriation which results from the usual bromine medication disappears entirely upon substituting medication by means of the new preparations.

The following examples, without being limitative, illustrate the present process, the parts being by weight.

Example 1

75.4 parts of calcium lactobionate and 30.8 parts of crystal water containing calcium bromide are dissolved under gentle heating in 75 parts of water. On cooling down the solution the calcium double salt crystallizes out in form of prismatic crystals containing 6 mol. of crystal water.

The analysis of the product dried over sulphuric acid has given the following values:

|  | Theoretical content | Analysis |
|---|---|---|
|  | Percent | Percent |
| $C_{24}H_{42}O_{24}Ca_2Br_2.6H_2O$ | Ca 7.54 | 7.44 |
|  | Br 15.04 | 14.93 |

In 100 parts of water of 20° C. 30 parts of the double salt are soluble, forming a colorless solution.

The same compound can be obtained if the above cited quantities of the starting materials are pulverized and mixed together, whereby first a melting of the mass under self-heating occurs; after a certain time, however, the mass becomes hard again.

Example 2

360 parts of milk sugar are dissolved in 720 parts of water and oxidized at low temperature and in presence of calcium hydroxide with the theoretical quantity of a freshly prepared calcium hypobromide solution. After the oxidation the clear filtered solution is evaporated at a reduced pressure, whereby the double compound cited in the Example 1 crystallizes out.

Example 3

37.7 parts of calcium maltobionate and 15.4 parts of calcium bromide containing water of crystallization are dissolved under heating in 40 parts of water. The new compound is isolated from the solution by evaporation at a low pressure or by precipitation by means of 2 parts of alcohol.

The new product possesses similar properties to that of the compound described in Example 1.

What we claim is:

1. A process for the manufacture of water-soluble calcium compounds, characterized in that dry calcium salts of polyhydroxymonocarboxylic acids, derived from polyaldoses are pulverized together with crystallized calcium bromide.

2. A process for the manufacture of a new water-soluble calcium compound, characterized in that equimolecular quantities of dry calcium lactobionate and of crystallized calcium bromide are triturated together.

3. A process for the manufacture of a new water-soluble calcium compound, characterized in that equimolecular quantities of dry calcium maltobionate and of crystallized calcium bromide are triturated together.

ARTHUR STOLL.
ERNST BURCKHARDT.